United States Patent
Shiratori et al.

(10) Patent No.: US 6,429,807 B2
(45) Date of Patent: Aug. 6, 2002

(54) FM-CW RADAR EQUIPMENT

(75) Inventors: Hideki Shiratori, Sendai; Naoki Motoni, Kobe, both of (JP)

(73) Assignees: Fujitsu Limited, Kawasaki; Fujitsu Ten Limited, Kobe, both of (JP)

( * ) Notice: Subject to any disclaimer, the term of this patent is extended or adjusted under 35 U.S.C. 154(b) by 0 days.

(21) Appl. No.: 09/754,776

(22) Filed: Jan. 4, 2001

(30) Foreign Application Priority Data

Apr. 28, 2000 (JP) ........................................ 2000-129768

(51) Int. Cl.[7] .............................. G01S 7/40; G01S 13/32
(52) U.S. Cl. .......................... 342/173; 342/89; 342/91; 342/128; 342/175
(58) Field of Search ................................ 342/89, 90, 91, 342/92, 93, 128–133, 159–164, 175, 195, 165–174, 70, 71, 72; 340/509

(56) References Cited

U.S. PATENT DOCUMENTS

| | | | |
|---|---|---|---|
| 3,820,114 A | * 6/1974 | Green | 342/165 |
| 3,932,870 A | * 1/1976 | Shapiro et al. | 340/509 |
| 4,138,678 A | * 2/1979 | Kirner | 342/173 |
| 4,180,816 A | * 12/1979 | Endo et al. | 342/70 |
| 4,739,351 A | * 4/1988 | Feldman | 342/169 |
| 5,254,998 A | * 10/1993 | LaBerge et al. | 342/173 |
| 5,287,111 A | * 2/1994 | Shpater | 342/173 X |

FOREIGN PATENT DOCUMENTS

| | | |
|---|---|---|
| JP | 6-059023 A | 3/1994 |
| JP | 7-198826 A | 8/1995 |
| JP | 8-184666 A | 7/1996 |
| JP | 11-052052 A | 2/1999 |
| JP | 11-166973 A | 6/1999 |

* cited by examiner

Primary Examiner—Bernarr E. Gregory
(74) Attorney, Agent, or Firm—Katten, Muchin Zavis Rosenman

(57) ABSTRACT

FM-CW radar equipment to solve a conventional problem of failure detection caused by the carrier level of amplitude modulation dispersing too largely to adjust to a constant level within a criterion range. A novel method is applied based on that a noise level greatly varies on occurrence of a failure in radio-frequency circuit. A failure can be detected by comparing the varied noise level with a noise level in normal condition. using this method, FM-CW radar equipment can be configured with a simple structure for detecting a failure in transmission/reception circuit. The equipment provides with a noise-level extraction circuit in radio-frequency circuit, and a comparator for comparing an output of the noise-level extraction circuit with a predetermined criterion value. An alarm is output when the comparator detects the output of the noise-level extraction circuit decreases to less than the predetermined criterion value.

7 Claims, 3 Drawing Sheets

FM-CW RADAR EQUIPMENT

FIELD OF THE INVENTION

The present invention relates to FM-CW (frequency modulated-continuous wave) radar equipment, more particularly to FM-CW radar equipment which enables to detect a failure in a radio-frequency circuit of the equipment.

BACKGROUND OF THE INVENTION

In FIG. 1, there is shown a conceptual schematic diagram of an RF (radio-frequency) circuit of FM-CW radar equipment. The equipment provides a transmitter 1 and a receiver 2. In transmitter 1, the amplitude modulation is carried out where a modulation signal 3 consisting of a triangle wave is modulated by a carrier signal 10. The modulated signal frequency is multiplied n-times by a frequency multiplier 11. The multiplied signal is then amplified by a power amplifier 13, to be transmitted by an antenna 4 through a non-illustrated transmission filter.

Moreover, a branching filter 12 is provided in transmitter 1. A part of signals transmitted from transmitter 1 are branched to input to receiver 2.

The transmitted signal is reflected by an object and then received by receiver 2 through an antenna 5. The signal is then forwarded to receiver 2, and input to receiver 2 through a non-illustrated reception filter.

The received signal is amplified in an amplifier to input to a mixer 21. In mixer 21, therefore, a beat frequency signal is output corresponding to the phase difference between the transmitted signal branched from branching filter 12 and the received reflection signal.

More particularly, the magnitude (amplitude level) of the beat frequency signal corresponds to the phase difference of the transmitted signal and the received reflection signal. This corresponds to the distance between transmitter 1 and the reflection object. Thus the distance to the object can be measured.

The beat frequency signal is divided into intermediate-frequency (IF) by a frequency demultiplier 22 and is output from receiver 2. The beat frequency signal divided into IF is used in a non-illustrated circuit to convert into a signal corresponding to the distance.

Meanwhile, as an application, FM-CW radar equipment is applicable for collision prevention equipment housed in a vehicle. In such a case, a failure of FM-CW equipment may possibly affect a human life. It is therefore important to detect a failure in FM-CW equipment in any case.

Among prior arts for detecting failure in such FM-CW radar equipment, an art is disclosed in the official gazette of Japanese Unexamined Patent Publication No. Hei-11-52052. In this disclosure, there is introduced a method for detecting an equipment failure by observing the level of an amplitude modulation signal. This prior art is based on the fact that an amplitude modulation signal disappears in IF output of a mixer when a failure occurs in any unit of the equipment.

In this prior art, however, an amplitude level of the modulation carrier disperses to a great extent. It is therefore difficult to adjust the level within a certain criterion range.

SUMMARY OF THE INVENTION

It is therefore an object of the present invention to provide FM-CW radar equipment which solves the aforementioned problem in the prior art.

In the present invention, there is applied a technological concept different from the conventional arts. The inventor has obtained the configuration of the present invention based on the following phenomenon: a noise level output from a mixer 21 changes when a failure occurs in an RF circuit of the equipment; there is a region generated by electronic characteristic of transmitter 1 in which a noise level changes as the frequency changes; and also there is a region generated by electronic characteristic of receiver 2 in which a noise level does not change, irrespective of the frequency.

The basic configuration of FM-CW radar equipment in accordance with the present invention includes a noise-level extraction circuit in RF circuit, and a comparator for comparing an output of the above-mentioned noise-level extraction circuit with a predetermined criterion value. The equipment is configured so that an alarm signal is output when the output of the noise-level extraction circuit becomes smaller than the predetermined criterion value.

Preferably, the noise-level extraction circuits include a first noise-level extraction circuit in the transmission side of the RF circuit; and a second noise-level extraction circuit in the reception side of the RF circuit. The comparators include a first comparator for comparing the output of the above-mentioned first noise-level extraction circuit with the first predetermined criterion value; and a second comparator for comparing the output of the second noise-level extraction circuit with the second predetermined criterion value.

Further, preferably, the circuits for extracting a noise level include a first noise-level extraction circuit in the transmission side of the RF circuit, and a second noise-level extraction circuit in the reception side of the RF circuit. There is provided a single comparator to which an output of the first noise-level extraction circuit or an output of the second noise-level extraction circuit is selectively input, respectively to compare with the predetermined first criterion value or the second criterion value.

Still further, preferably, in either of the aforementioned embodiments, the first noise-level extraction circuit at the transmission side consists of a low-pass filter transmitting a signal in a first frequency bandwidth in which the noise level changes with frequency; and the second noise-level extraction circuit at the reception side consists of a band-pass filter transmitting a signal in a second frequency bandwidth in which the noise level substantially does not change with frequency.

Still further, preferably, the aforementioned second frequency bandwidth is located in higher frequency region than the first frequency bandwidth.

Further scopes and features of the present invention will become more apparent by the following description of the embodiments with the accompanied drawings.

DETAILED DESCRIPTION OF THE PREFERRED EMBODIMENTS

The preferred embodiments of the present invention are described hereinafter referring to the charts and drawings, wherein like numerals or symbols refer to like parts.

Figure 2:
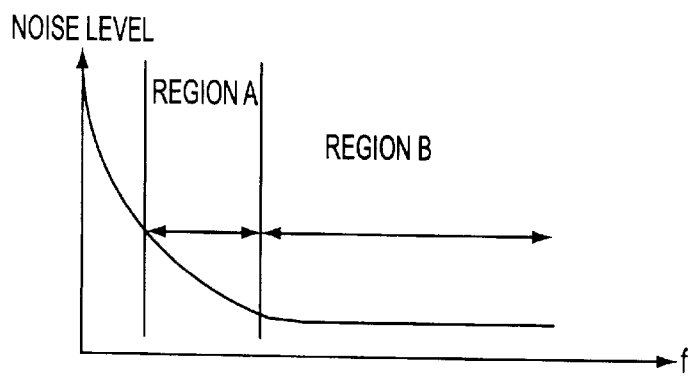
FIG. 2 is a diagram for illustrating the relation between the noise level and the frequency region.

In FIG. 2, there is a chart illustrating the above-mentioned relation between a noise level and a frequency region. In this figure, the horizontal axis indicates frequency, and the vertical axis indicates noise level. In region A, noise reduces as the frequency increases. In region B, noise is maintained substantially in the constant level irrespective of the frequency. In noise in region A is mainly produced by the transmission signal distributed from the transmitter 1 side. The noise fluctuates up and down around the transmission signal level. The noise in region B is produced by the thermal noise generated from the receiver 2 side. The noise fluctuates up and down around the magnitude of receiving gain.

When a circuit failure occurs in the transmitter 1 side, the noise in region A is decreased. On the other hand, when a circuit failure occurs in the receiver 2 side, the noise in region B is decreased. The present invention is led by the discovery of the above-mentioned phenomenon. The boundary frequency between region A and region B is less than several MHz, depending on the installed system.

Figure 3:
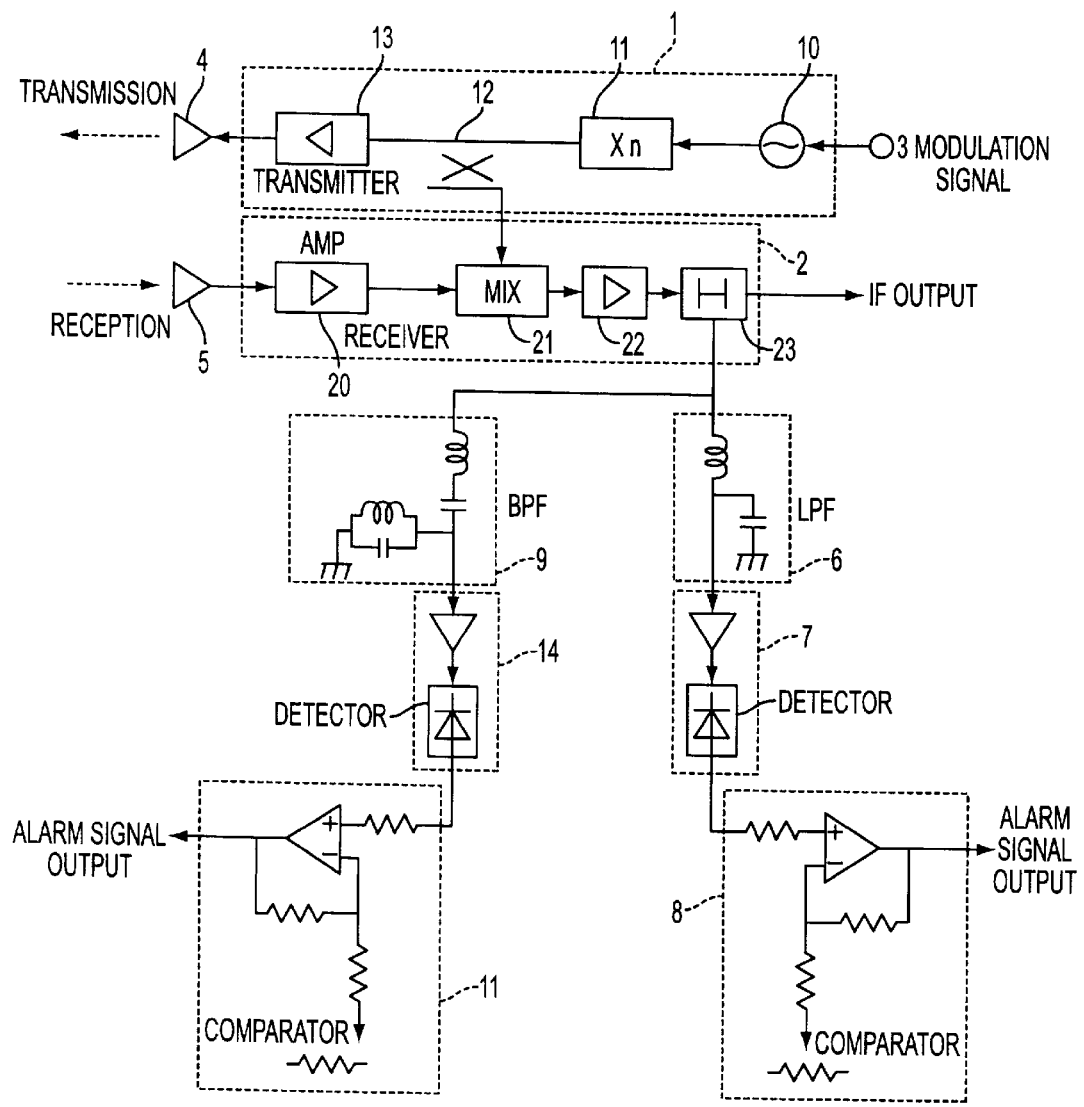
FIG. 3 is a circuit configuration of an embodiment of FM-CW radar equipment in accordance with the present invention, using the phenomenon illustrated in FIG. 2.

In FIG. 3, there is shown an embodiment of a configuration of the RF circuit in FM-CW radar equipment using the phenomenon described above.

Figure 1:
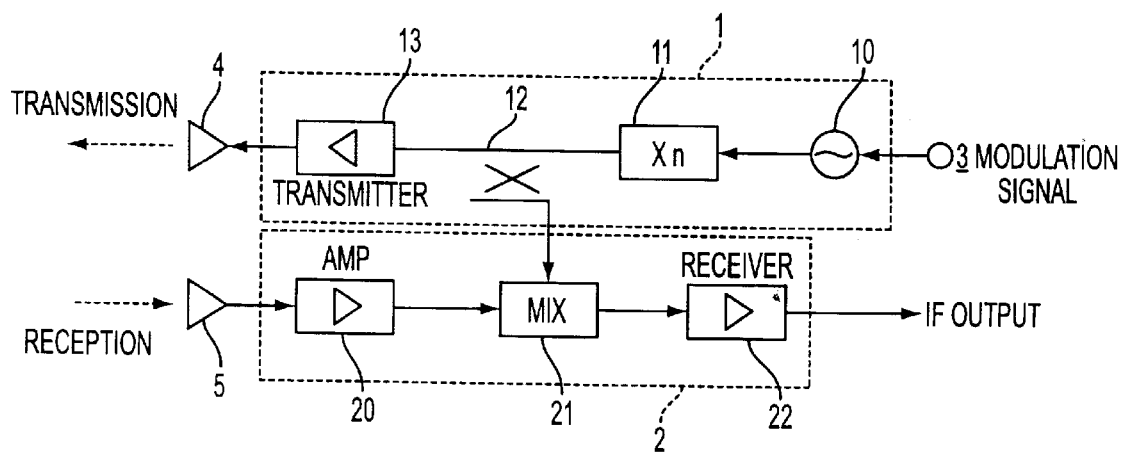
FIG. 1 is a conceptual schematic diagram of an RF circuit of FM-CW radar equipment in accordance with the present invention.

This is similar to the RF circuit of FM-CW radar equipment of the invention shown in FIG.1, except that a hybrid circuit 23 is provided in receiver 2 in the case of FIG. 3.

Hybrid circuit 23 branches a part of IF output signal which is output from frequency demultiplier 22, to input to low-pass filter 6 and band-pass filter 9. Low-pass filter 6 has a filtering property to transmit a component of frequency region A shown in FIG. 2, while band-pass filter has a filtering property to transmit a component of the predetermined frequency region B in FIG. 2.

A detector 7 extracts direct current (DC) level from an output of low-pass filter 6. Similarly, a detector 14 extracts DC level from an output of band-pass filter 9.

Figure 4:
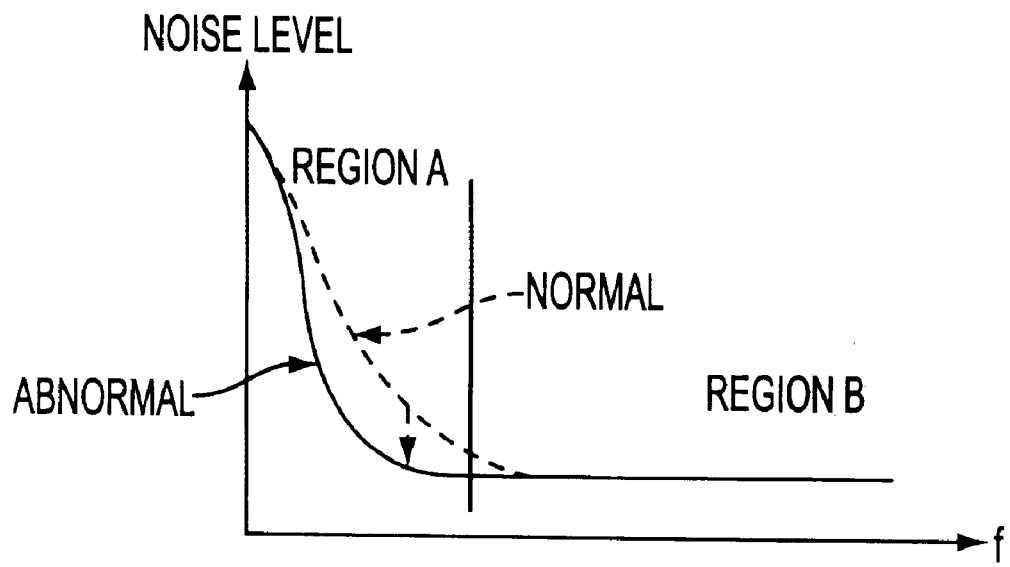
FIG. 4 is a diagram illustrating decreased noise level caused by a failure in transmitter 1.

As explained earlier, a noise component in region A is increased or decreased by a power level of transmitter 1 side, while a noise component in region B is increased or decreased by a gain of receiver 2 side. Therefore, when a failure exists in transmitter 1 side, the output of low-pass filter 6 is either decreased or cut off. FIG. 4 illustrates this situation. A failure in transmitter 1 causes the noise level in region A decreased from a normal value NM to a level illustrated as AB.

Figure 5:
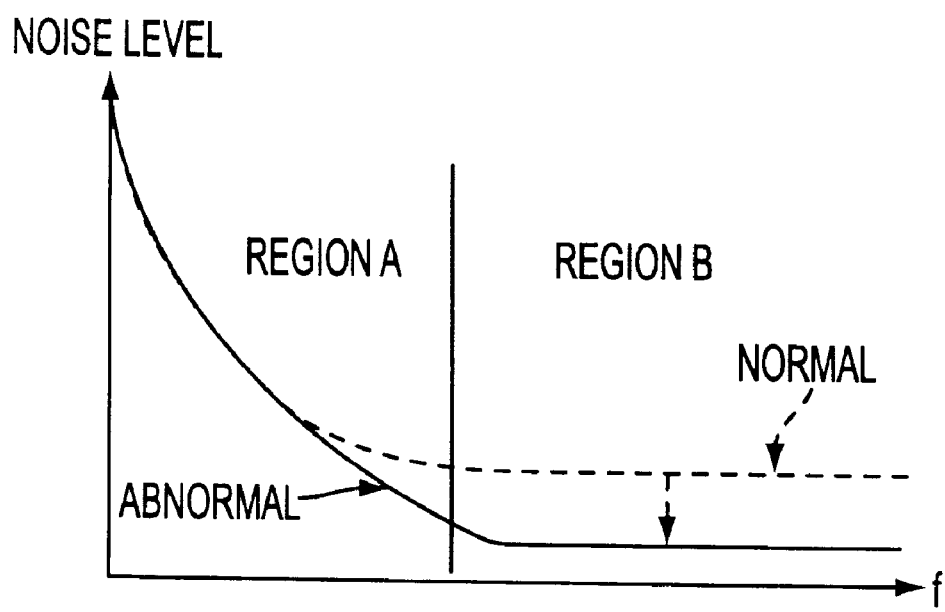
FIG. 5 is a diagram illustrating decreased noise level caused by a failure in receiver 2.

On the other hand, when a failure exists in receiver 2, the output of band-pass filter 6 is either decreased or is cut off. FIG. 5 illustrates this situation. A failure in receiver 2 causes the noise level in region B decreased from a normal value NM to a level illustrated as AB.

Referring back to FIG. 3, detector 7 converts an output of low-pass filter 6 into DC component. Also, detector 14 converts an output of band-pass filter 9 into DC component.

Moreover, comparator 8 compares an output of detector 7 with a predetermined criterion value. An alarm signal is output when the output of detector 7 becomes smaller than the predetermined criterion value. Similarly, comparator 15 compares an output of detector 14 with a predetermined criterion value. When the output of detector 10 becomes smaller than the predetermined criterion value, an alarm signal is output.

Accordingly, through an alarm signal output from comparator 8, a failure in transmitter 1 of FM-CW radar equipment is detected. Also, through an alarm signal output from comparator 15, a failure in receiver 2 of FM-CW radar equipment is detected.

In the above embodiment shown in FIG. 3, there are provided first comparator 8 for comparing a noise level in transmitter 1 with a predetermined criterion value, and second comparator 15 for comparing a noise level in receiver 2 with a predetermined criterion value. However, it is possible to use a single comparetor in common, instead of two independent comparators 8 and 15.

More particularly, with a provision of a comparator in which setting criterion values is possible, and by switching an input to the comparator from a DC level output of either detector 7 or detector 14, it is possible to detect a failure of transmitter 1 and receiver 2 successively.

As explained above, when a failure occurs in the RF circuit in FM-CW radar equipment, the noise level is greatly changed. According to the present invention, this change in noise level is compared to the noise level in normal state to detect a circuit failure. Thus FM-CW radar equipment enabling the supervision of a failure in a transmitter or receiver becomes available with a simple structure.

The foregoing description of the embodiment is disclosed for the sake of understanding. It is not intended to limit the invention to the particular details of the examples illustrated. Any suitable modification and equivalents may be resorted to the scope of the invention which is covered by the appended claims.

What is claimed is:

1. FM-CW radar equipment comprising:
   a noise-level extraction circuit for extracting a noise level in a radio-frequency circuit;
   a comparator for comparing an output of said noise-level extraction circuit with a predetermined criterion value; and
   an alarm signal output circuit for outputting an alarm when said comparator detects the output of the noise-level extraction circuit becomes smaller than said predetermined criterion value.

2. The FM-CW radar equipment according to claim 1 wherein said noise-level extraction circuit includes:
   a first circuit for extracting a noise level of the transmission side in said radio-frequency circuit; and
   a second circuit for extracting a noise level of the reception side in said radio-frequency circuit,and said comparator includes:
   a first comparing circuit for comparing an output of said first circuit with a first predetermined criterion value; and
   a second comparing circuit for comparing an output of said second circuit with a second predetermined criterion value.

3. The FM-CW radar equipment according to claim 2, wherein said first circuit for extracting a noise level of the transmission side comprises a low-pass filter to transmit a signal having a first frequency bandwidth in which the noise level changes with frequency, and said second circuit for extracting a noise level of the reception side comprises a band-pass filter to transmit a signal having a second frequency bandwidth in which the noise level substantially does not change with frequency.

4. The FM-CW radar equipment according to claim 3 wherein said second frequency bandwidth is located in the higher frequency range than said first frequency bandwidth.

5. The FM-CW radar equipment according to claim 1 wherein said noise-level extraction circuit includes:
   a first circuit for extracting a noise level of the transmission side in said radio-frequency circuit; and
   a second circuit for extracting a noise level of the reception side in said radio-frequency circuit, and said comparator includes:
   a comparing circuit for comparing an output of said first circuit with the corresponding said first predetermined criterion value, or an output of said second circuit with the corresponding said second predetermined criterion value, by selectively inputting to said comparing circuit the output of either said first circuit or said second circuit.

6. The FM-CW radar equipment according to claim 5, wherein said first circuit for extracting a noise level of the transmission side comprises a low-pass filter to transmit a signal having a first frequency bandwidth in which the noise level changes with frequency, and said second circuit for extracting a noise level of the reception side comprises a band-pass filter to transmit a signal having a second frequency bandwidth in which the noise level substantially does not change with frequency.

7. The FM-CW radar equipment according to claim 6 wherein said second frequency bandwidth is located in the higher frequency range than said first frequency bandwidth.

* * * * *